United States Patent [19]

Masuda et al.

[11] Patent Number: 5,677,027
[45] Date of Patent: Oct. 14, 1997

[54] SOUND INSULATING STRUCTURE

[75] Inventors: Yuugorou Masuda, Takatsuki; Shousuke Oku, Osaka; Masashi Ito, Yokosuka; Tomohiro Ito, Tokyo; Hiroshi Sugawara, Yokosuka, all of Japan

[73] Assignees: Nissan Motor Co., Ltd., Yokohama; Kanebo Ltd., Osaka, both of Japan

[21] Appl. No.: 584,278

[22] Filed: Jan. 11, 1996

[30] Foreign Application Priority Data

Jan. 13, 1995 [JP] Japan .................... 7-003913

[51] Int. Cl.[6] ........................................ B32B 3/02
[52] U.S. Cl. ................. 428/96; 428/95; 442/364; 442/378
[58] Field of Search ................... 428/284, 286, 428/288, 95, 96; 442/364, 378

[56] References Cited

U.S. PATENT DOCUMENTS 4,840,832   6/1989   Weinle et al. ............... 428/156

FOREIGN PATENT DOCUMENTS 3-176241   7/1991   Japan .
7-223478   8/1995   Japan .

*Primary Examiner*—Christopher Raimund
*Attorney, Agent, or Firm*—Foley & Lardner

[57] ABSTRACT

The disclosure relates to a sound insulating structure formed on an automobile floor panel on which at least one of a vibration and a sound is incident. This structure includes a covering layer for covering the panel and a cushioning layer for reducing an impact of the at least one of the vibration and the sound. This cushioning layer is interposed between the covering layer and the panel and made of a nonwoven fabric. This nonwoven fabric includes 5–95 wt % of a first fiber and 5–95% of a second fiber, wherein the total amount of the first and second fibers is 100 wt %. This first fiber has a fineness within a range from 1.5 to 40 deniers, a first melting point, and a first portion including polyethylene terephthalate. The second fiber has a fineness within a range from 1.5 to 15 deniers, a core portion, and a sheath portion covering the core portion. A majority of the core portion includes polyethylene terephthalate. The sheath portion includes an elastic copolyester which has a second melting point that is lower than the first melting point and is not higher than 200° C. The elastic copolyester is prepared by copolymerizing polyethylene terephthalate and at least one other monomer. The sound insulating structure has a high sound-transmission-loss factor within a so-called road-noise frequency range and an adequate cushioning effect and is particularly superior in sound insulating at a normal temperature (15°–40° C.).

16 Claims, 2 Drawing Sheets

SOUND INSULATING STRUCTURE

BACKGROUND OF THE INVENTION

1. Field of the Invention

The present invention relates in general to a sound insulating structure for reducing an impact of vibration and/or sound which is incident on the structure from outside, and more particularly to a sound insulating structure that is suitable as an insulating floor carpet for an automobile floor panel, for reducing an impact of vibration and/or sound which is incident on the structure from the panel.

2. Description of the Prior Art

A conventional automobile insulating carpet, which is formed on an automobile floor panel, has a cushioning or insulating soft layer for reducing an impact of vibration and/or sound which is incident on the panel. Hitherto, there have been proposed various materials for the cushioning layer, such as felt, foamed urethane and nonwoven fabric made of, for example, common polyester fibers. Such felt generally used is prepared, for example, by at first breaking up a used cloth into fibers, then by matting the fibers into a woollike mass, and then by subjecting this mass to the needle punching treatment or by adding a binder such as phenol resin to this mass and then heating this binder-added mass to harden the same. The thus prepared felt having an apparent density from about 0.04 to about 0.2 g/cm$^3$ and a thickness from about 5 to about 30 mm is generally used.

An important requirement for an automobile insulating carpet is to reduce noises such as a so-called road-noise (i.e., a noise incident on an automobile from road). In case that the above-mentioned felt is used for the cushioning layer, the resonance point (i.e., the point of frequency at which the sound transmission loss becomes minimum) of this cushioning layer falls within the road-noise frequency range (250–700 Hz). The noise which is incident on the cushioning layer from the floor panel and within the road-noise frequency range is much greater than the noise outside this range. Therefore, in case of the felt, the loss factor of noise becomes low, and thus it is not possible to obtain a sufficient damping effect and a good sound insulation.

In view of the above-mentioned drawback of the felt, there has been proposed a urethane foamed body as another material for the cushioning layer. For example, Japanese Patent Unexamined First Publication JP-A-Hei-3-176241 discloses a method of producing an automobile floor carpet. This carpet has a foamed polyurethane layer 3, an outer polyurethane layer 4, and nylon fibers (flock) 5 formed on the layer 4 by electrocoating. The thus proposed foamed urethane body has a higher loss factor and a lower noise transmission loss at the resonance point, respectively than those of the above felt, common polyester nonwoven fabric and the like. However, the foamed urethane body has the following first and second drawbacks.

The first drawback of the foamed urethane body is as follows. The spring constant of the foamed urethane body is higher than that of the felt, and the frequency of resonance point of the foamed urethane body is also higher than that of the felt. Therefore, in case of the foamed urethane body, the frequency range for the effective damping which is higher than the resonance point is narrower than that of the felt. Therefore, when the foamed urethane body has the same thickness as that of the felt, the former is inferior to the latter in the transmission loss within the overall frequency range (e.g., 250–6,400 Hz). Some measures can be taken for the purpose of obtaining a sufficient sound insulation. One of these measures is to increase the thickness of the foamed urethane body. Another measure is to increase the weight of a backing layer interposed between the carpet surface layer and the cushioning layer. With this measure, the resonance point is lowered, and thus the frequency range for the effective damping is widened. However, these measures increase the automobile's weight and the production cost.

The second drawback of the foamed urethane body is as follows. The cost for producing the foamed urethane body is high. Furthermore, in the production of the foamed urethane body, it is necessary to provide an injection step of a polyol and an isocyanate in the form of liquid, a foaming step, and an bonding step. Therefore, it takes a long time and it is necessary to provide a large size facility with an exhaust apparatus, for producing the foamed urethane body. Thus, the foamed urethane body is inferior in productivity and economical efficiency.

As an alternative to the above-mentioned felt and foamed urethane body, a nonwoven fabric has been proposed for the cushioning layer. Polyester fiber is very widely used to prepare this fabric, because it is high in Young's modulus and elastic modulus. For example, Japanese Patent Unexamined First Publication JP-A-Hei-7-223478 discloses a nonwoven fabric made of a polyester fiber comprising at least two types of polyester fibers (i.e., a high-melting-point polyester fiber and a low-melting-point polyester fiber). These at least two fibers are bonded together by heating these fibers at a temperature within a range from the melting point of the low-melting-point fiber to the melting point of the high-melting-point fiber. It is mentioned in this publication that the low-melting-point fiber preferably has a core-and-sheath structure and that the melting point different between these fibers is preferably at least 20° C.

SUMMARY OF THE INVENTION

It is an object of the present invention to provide a sound insulating structure which is high in sound transmission loss factor within the road-noise frequency range and particularly superior in damping effect and sound insulation in a normal temperature range (15° to 40° C.), light in weight and suitable as an automobile insulating floor carpet.

According to the present invention, there is provided a sound insulating structure formed on a panel on which at least one of a vibration and a sound is incident, said structure comprising:

a covering layer for covering the panel; and a cushioning layer for reducing an impact of the at least one of the vibration and the sound, said cushioning layer being interposed between said covering layer and the panel and made of a nonwoven fabric, said nonwoven fabric comprising 5–95 wt % of a first fiber having a fineness within a range from 1.5 to 40 deniers, a first melting point, and a first portion comprising polyethylene terephthalate, and 5–95 wt % of a second fiber having a fineness within a range from 1.5 to 15 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total weight of said first and second fibers being 100 wt %.

DESCRIPTION OF THE PREFERRED EMBODIMENTS

In the following, a sound insulating structure according to the present invention will be described in detail. This sound insulating structure is used preferably as an automobile insulating floor carpet.

Figure 1:
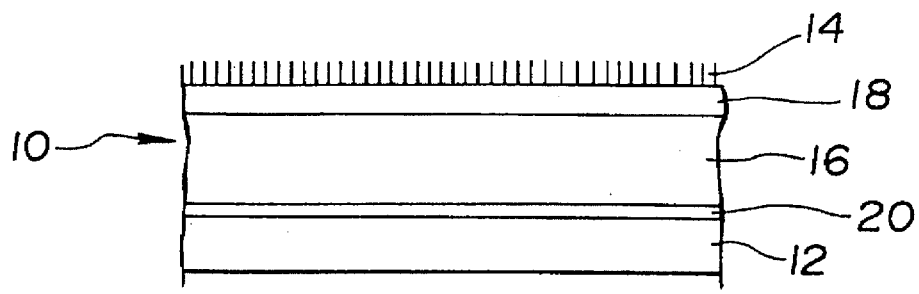
FIG. 1 is an elevational sectional view showing a sound insulating structure according to the present invention, which is formed on an automobile floor panel.

As is seen from FIG. 1, a sound insulating structure 10 is, for example, formed on an automobile floor panel 12 made of steel. The structure 10 comprises a covering layer 14 (i.e. carpet outer skin layer or carpet proper) for covering the panel 12 and a cushioning layer 16 for reducing an impact of at least one of a vibration and a sound which is incident on the panel 12. It is usual that the structure 10 further has a backing layer 18 made of a thermoplastic resin, which serves to back the covering layer 14 and is interposed between the cushioning layer 16 and the covering layer 14, and a fusible insulator layer 20 which is made of, for example, an asphalt sheet and interposed between the floor panel 12 and the cushioning layer 16.

In the invention, the cushioning layer is made of a special nonwoven fabric. This fabric comprises 5–95 wt % (preferably 20–80 wt %) of a first fiber (i.e., a high-melting-point fiber) and 5–95 wt % (preferably (20–80 wt %) of a second fiber (i.e., a core-and-sheath type composite or conjugated fiber), wherein the total amount of the first and second fiber is 100 wt %. The first fiber has a melting point which is higher than that of the second fiber and preferably at least 200° C. If the amount of the second fiber exceeds 95 wt %, the cushioning layer becomes too hard or stiff. With this, the cushioning layer becomes inferior in cushioning action. Furthermore, too high proportion of the second fiber causes the production cost increase, because the second fiber is more expensive than the first fiber containing polyethylene terephthalate as a main component thereof. If the amount of the second fiber is less than 5 wt %, a shaped body of the nonwoven fabric is lowered in stability.

As is mentioned hereinabove, the first fiber includes polyethylene terephthalate as a main component thereof. In other words, the first fiber may be a single component fiber made of only polyethylene terephthalate or an eccentric-type composite or conjugated fiber. This eccentric-type conjugated fiber has first and second portions which are bonded together and eccentrically arranged with each other in a transverse section of the eccentric fiber. The first portion comprises polyethylene terephthalate. The second portion comprises a copolymer prepared by copolymerizing polyethylene terephthalate and at least one monomer selected from the group consisting of a glycol component, a dibasic acid component, and a hydroxycarboxylic acid. This glycol component is different from ethylene glycol, and this dibasic acid component is different from terephthalic acid.

Examples of the above-mentioned glycol component are trimethylene glycol, tetramethylene glycol, diethylene glycol, pentaerythritol, and bisphenol A. Examples of the above-mentioned dibasic acid component are aromatic dicarboxylic acids such as isophthalic acid and naphthalene-dicarboxylic acid, fatty acid dicarboxylic acids such as glutaric acid, adipic acid and cyclohexanedicarboxylic acid. An example of the above-mentioned hydroxycarboxylic acid is para-hydroxybenzoic acid. It is preferable that the thus exemplified at least one monomer for the first fiber is added in an amount such that the above-mentioned second portion (i.e. polyethylene terephthalate copolymer) of the first fiber has a melting point of at least 200° C. The above-mentioned eccentric-type conjugated fiber is preferably used as the first fiber, because this eccentric-type fiber becomes crimped by a heat treatment and thus provides the cushioning layer which is superior in external appearance.

The eccentric-type conjugated fiber as the first fiber may be a solid-type fiber. In other words, this fiber has an inside which is free of a hallow space(s). However, it is preferable that this eccentric-type conjugated fiber is a fiber mixture comprising a first conjugated fiber portion having an inside which is free of a hollow space(s) and a second conjugated fiber portion which has an inside having a hollow space(s) and amounts to 20–35 wt % based on the weight of the first conjugated fiber portion. With this, the sound insulation efficiency is greatly increased.

In the invention, the above-mentioned first and second fibers have a fineness within a range from 1.5 to 40 deniers and a fineness within a range from 1.5 to 15 deniers, respectively. If the fineness of the first or second fiber is less than 1.5 deniers, the polymer discharge amount in the melt spinning process becomes small and thus the spinning rate decreases, or the efficiency of the carding process is lowered by thread breakage, or the carding rate is lowered in the process of producing the nonwoven fabric. With this, the production cost increases. On the other hand, if the fineness of the first fiber is greater than 40 deniers, the spinning rate is relatively lowered due to the upper limit of the polymer discharge amount in the melt spinning process, and the difference of fineness between the first and second fibers becomes too much and thus the carding rate in the process of producing the nonwoven fabric is lowered, thereby increasing the production cost. If the fineness of the second fiber is greater than 15 deniers, the fiber number of the nonwoven fabric and the number of the thermally fused points in the nonwoven fabric decreases to an extent that the nonwoven fabric becomes insufficient in resilience and that the nonwoven fabric may be in a so-called fatigue to a great extent.

In the invention, the second fiber has a core portion and a sheath portion covering the core portion. A majority of the core portion comprises polyethylene terephthalate. The sheath portion comprises an elastic copolyester which is prepared by copolymerizing polyethylene terephthalate (as a main copolymerizing monomer) and at least one other monomer. The elastic copolyester of the second fiber preferably has a tan δ of at least 0.1 within a normal temperature range (i.e., 15°–40° C.), wherein this tan δ is defined as a ratio of a loss elasticity (i.e., dynamic loss, $E_2$) of the elastic copolyester to a storage modulus (i.e., dynamic modulus of elasticity, $E_1$) of the elastic copolyester. Thus, the first and second fibers are preferably bonded together by fusing the elastic copolyester. With this, the nonwoven fiber becomes superior in shape stability.

When the elastic copolyester of the second fiber has a tan δ of at least 0.1, this copolyester has a kind of phase transition in its polymer chain. At near the phase transition, friction between the molecular chains becomes great. Therefore, energy of a vibration incident on the elastic copolyester is efficiently transformed into thermal energy. With this, the cushioning layer has a good damping effect. Thus, it is considered that a vibration having a frequency range near the resonance point is efficiently suppressed, thereby improving the sound transmission loss.

Figure 3:
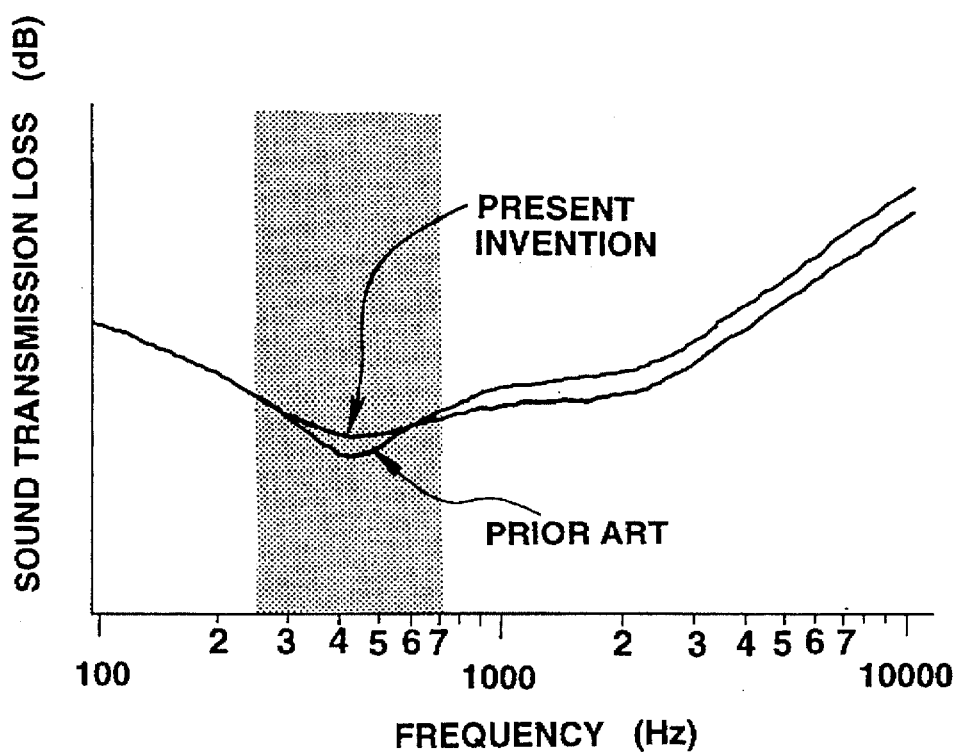
FIG. 3 is a graph showing the relationship between the sound transmission loss of the sound insulating structures according to the present invention and to prior art and the noise frequency, wherein the mesh portion represents the road-noise frequency range (250–700 Hz).
Figure 2:
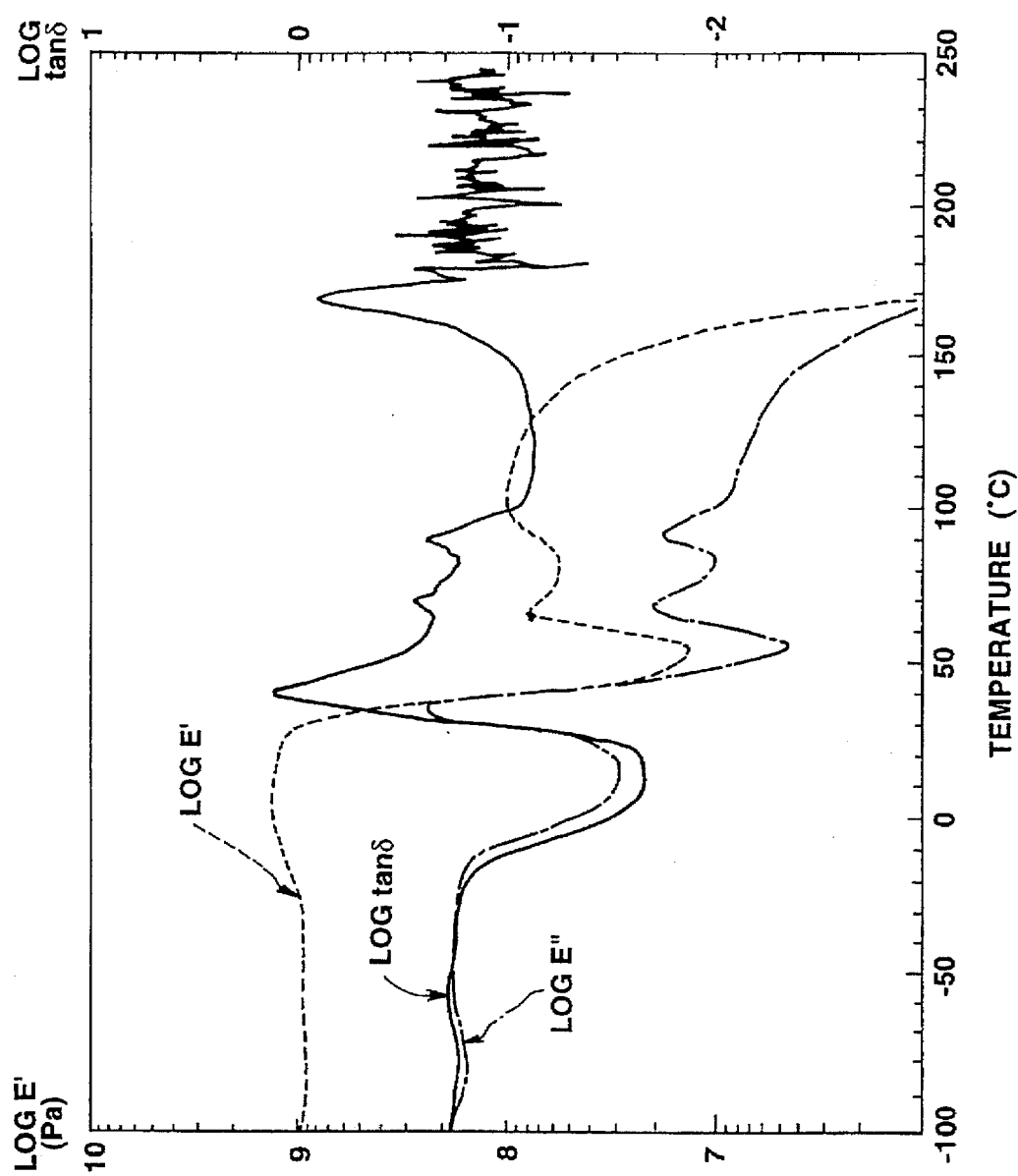
FIG. 2 is a graph showing the relationship between log tan δ of the elastic copolyester of the second fiber according to the present invention and temperature.

Polyethylene terephthalate, which is a polyester having a glycol component having a chain of two methylene groups, has a high glass transition temperature (Tg). Therefore, the elastic copolyester having the peak value of tan δ of at least 0.1 within or near the normal temperature range (15°–40° C.) can be obtained by copolymerizing polyethylene terephthalate and the at least one other monomer which is, for example, a glycol having a chain of at least four methylene groups. The thus prepared copolyester provides a superior sound insulation effect under a condition of actual use. In other words, as is shown in FIG. 2, when the elastic copolyester having a tan δ of at least 0.1 within a temperature range from 15° to 40° C. is used as a material for the sheath portion of the second fiber, the nonwoven fabric of the cushioning layer provides a superior damping effect within the normal temperature range where the sound insulating structure is actually used. Thus, as is shown in FIG. 3, the sound transmission loss of the sound insulation structure of the present invention at and near the resonance point is increased, relative to that of prior art. Furthermore, the cushioning layer becomes stable in shape.

It is preferable that the elastic copolyester of the sheath portion is prepared by copolymerizing polyethylene terephthalate as a main copolymerizing monomer and the at least one other monomer and that the elastic copolyester has a heat of fusion of up to 6 cal/g and a melting point which is lower than the melting point of the first fiber and up to 200° C., in view of the spinning process of the second fiber and formability of the nonwoven fabric's shape. It is preferable that the above-mentioned at least one other monomer comprises a glycol having a chain of at least four methylene groups. Examples of the at least one other monomer are an ester formed by the union of a glycol having a chain of at least four methylene groups and terephthalic acid, such as polybutylene terephthalate or polyhexamethylene terephthalate, polycaprolactone, and a polyether as the glycol having a chain of at least four methylene groups, such as polytetramethylene glycol.

In the invention, it is preferable that the cushioning layer has a hardness such that the cushioning layer is compressed by 25% when it receives a load ranging from 4 to 60 kgf. In the following, this will be referred to as that 25% hardness of the cushioning layer is from 4 to 60 kgf. If it is less than 4 kgf, the cushioning layer may become insufficient in resilience. If it is greater than 60 kgf, the cushioning layer may become too hard and may not function properly. The 25% hardness of the cushioning layer is more preferably from 5 to 40 kgf.

In the invention, it is preferable that the cushioning layer has a thickness within a range from 2 to 50 mm. If it is less than 2 mm, the cushioning layer may not function properly. If it is greater than 50 mm, the cushioning layer may become too much in volume and weight.

In the invention, it is preferable that the nonwoven fabric for the cushioning layer has an apparent density within a range from 0.03 to 0.1 g/cm$^3$. If it is less than 0.03 g/cm$^3$, the cushioning layer may become too soft, and may be easily in fatigue (i.e. permanent deformation by pressure) and insufficient in resilience. Therefore, the cushioning layer may not function properly. If it is more than 0.1 g/cm$^3$, the cushioning layer may become too hard. With this, the cushioning layer may not have a sufficient damping capability.

The present invention will be illustrated with reference to the following nonlimitative Examples. In the following Examples and Comparative Examples, "part(s) by weight" will be expressed as "part(s)" for simplicity, unless otherwise described.

EXAMPLE 1

In this example, as is shown in FIG. 1, a sound insulation structure 10 having a cushioning layer 16 of the present invention was formed on a flat steel plate 12 as an automobile floor panel. This steel plate 12 had a thickness of 0.8 mm and a surface density of 6.3 kg/m$^2$. In general, an actual automobile floor panel may not have a flat shape, but may have a so-called bead shape to increase stiffness of the panel or may have an irregular shape to provide a space(s) for a heater duct and/or a wiring harness. However, a flat steel plate was used in this example for the purpose of easily determining the 25% hardness and the sound transmission loss. It is needless to say that a nonwoven fabric of the present invention for the cushioning layer can be desirably shaped by a press machine to correspond to the shape of the actual automobile floor panel which is not flat.

In this example, a united member in which a tufted pile carpet as a covering layer 14 and a polyethylene sheet as a backing layer 18 had been previously bonded together was used. This tufted pile carpet had a weight per unit are (METSUKE) of 580 g/m$^2$. The polyethylene sheet had a weight per unit area of 600 g/m$^2$. As a fusible insulator layer 20, an asphalt sheet having a thickness of 2.5 mm and a surface density of 4.0 kg/m$^2$ was used.

As the cushioning layer 16, a nonwoven fabric which is made of polyester and has a weight per unit area of 1,000 g/m$^2$ at a thickness of 30 mm was prepared as follows. At first, this nonwoven fabric was prepared by mixing together the following three components as first and second fibers of the present invention. That is, as the first fiber, 60 parts of side-by-side solid-type conjugated fibers having a fineness of 2 deniers and a length of 51 mm, and 20 parts of side-by-side hollow-type conjugated fibers having a fineness of 6 deniers and a length of 51 mm were used. As the second fiber, 20 parts of elastic thermally-fusible conjugated fibers having a melting point of 170° C., a fineness of 2 deniers and a length of 51 mm was used. This second fiber was prepared so as to have a core portion made of polyethylene terephthalate and a sheath portion made of an elastic copolyester. This copolyester was prepared by copolymerizing polyethylene terephthalate, polybutylene terephthalate, polycaprolactone, and the like.

The thus prepared nonwoven fabric was heated at a temperature of 190° C. in an oven so as to melt the second fiber. Then, this fabric was shaped by a press machine to have a thickness of 20 mm and an apparent density of 0.05 g/cm$^3$. The thus prepared cushioning layer had a 25% hardness of 10 kgf.

Similar to Example 1, each of the shaped nonwoven fabrics according to the aftermentioned Examples 2–18 also had an apparent density of 0.05 g/cm$^3$.

The united member of the covering layer 14 and the backing layer 18, the cushioning layer 16, the fusible insulator layer 20, and the steel plate 12 were bonded together in the order shown in FIG. 1. In fact, the polyethylene sheet as the backing layer was melted at 130° C., and under this condition the cushioning layer was placed on the polyethylene sheet, followed by cooling, to achieve a bonding therebetween. However, according to the present invention, a spunbonded foundation cloth or a thermally fusible nonwoven fabric may be used to achieve the bonding between the backing layer and the cushioning layer.

Using the thus prepared sample which is a laminate of the steel plate and the sound insulating structure formed thereon, the following evaluation tests were conducted, except 25% hardness test. The results are so-called comparative results and shown in Table 1. In other words, in Table 1, "A" means that Example was much superior to Comparative Example; "B" means that Example was somewhat superior to Comparative Example; and "C" means that Example was equal to Comparative Example. For example, as shown in the first row of Table 1, the transmission loss result of Example 1 was much superior to that of Comparative Example 1, within a frequency range from 250 to 700 Hz, within a frequency range greater than 700 Hz, and within an overall frequency range from 250 to 6,400; and the cushioning effect of Example 1 was somewhat superior to that of Comparative Example 1.

1. 25% HARDNESS

In this test, only the cushioning layer was used. In fact, according to need, a plurality of the cushioning layers were laminated to have a thickness of at least 50 mm. A load was added to the cushioning layer so as to compress the same by 25%, in accordance with Japanese Industrial Standard (JIS) K 6382-1978, using a load an aluminum disk having a diameter ($\phi$) of 200 mm and a thickness of 5 mm. Upon this, the value of this load was measured and defined as 25% hardness.

2. SOUND TRANSMISSION LOSS

The sound transmission loss was measured in accordance with Japanese Industrial Standard (JIS) A 1416, using the sample.

3. CUSHIONING EFFECT

Using the sample, a load up to 5 kgf was added to the cushioning layer, with the same testing machine described in JIS K 6382-1987 and an iron disk having a diameter of 150 mm. Upon this, the amount of compression of the cushioning layer was measured.

EXAMPLE 2

In this example, Example 1 was repeated except in that the mixing ratio of the three types of fibers was modified. That is, as the first fiber, 70 parts of the solid-type conjugated fibers and 20 parts of the hollow-type conjugated fibers, and as the second fiber 10 parts of the elastic thermally-fusible fibers were used. The shaped cushioning layer had a 25% hardness of 8.0 kgf.

EXAMPLE 3

In this example, Example 1 was repeated except in that the mixing ratio of the three types of fibers was modified. That is, as the first fiber, 75 parts of the solid-type conjugated fibers and 20 parts of the hollow-type conjugated fibers, and as the second fiber 5 parts of the elastic thermally-fusible fibers were used. The shaped cushioning layer had a 25% hardness of 6.0 kgf.

EXAMPLE 4

In this example, Example 1 was repeated except in that the mixing ratio of the three types of fibers was modified. That is, as the first fiber, 40 parts of the solid-type conjugated fibers and 20 parts of the hollow-type conjugated fibers, and as the second fiber 40 parts of the elastic thermally-fusible fibers were used. The shaped cushioning layer had a 25% hardness of 25.0 kgf.

EXAMPLE 5

In this example, Example 1 was repeated except in that the mixing ratio of the three types of fibers was modified. That is, as the first fiber, 20 parts of the solid-type conjugated fibers and 20 parts of the hollow-type conjugated fibers, and as the second fiber 60 parts of the elastic thermally-fusible fibers were used. The shaped cushioning layer had a 25% hardness of 50 kgf.

EXAMPLE 6

In this example, Example 1 was repeated except in that, as the first fiber, 60 parts of the solid-type conjugated fibers and 20 parts of the hollow-type conjugated fibers, and as the second fiber 20 parts of elastic thermally-fusible conjugated fibers having a fineness of 15 deniers, a length of 51 mm and a melting point of 170° C. were used. The shaped cushioning layer had a 25% hardness of 8.0 kgf.

EXAMPLE 7

In this example, Example 6 was repeated except in that the mixing ratio of the three types of fibers was modified. That is, as the first fiber, 70 parts of the solid-type conjugated fibers and 20 parts of the hollow-type conjugated fibers, and as the second fiber 10 parts of the elastic thermally-fusible fibers were used. The shaped cushioning layer had a 25% hardness of 6.0 kgf.

EXAMPLE 8

In this example, Example 6 was repeated except in that the mixing ratio of the three types of fibers was modified. That is, as the first fiber, 75 parts of the solid-type conjugated fibers and 20 parts of the hollow-type conjugated fibers, and as the second fiber 5 parts of the elastic thermally-fusible fibers were used. The shaped cushioning layer had a 25% hardness of 4.0 kgf.

EXAMPLE 9

In this example, Example 6 was repeated except in that the mixing ratio of the three types of fibers was modified. That is, as the first fiber, 40 parts of the solid-type conjugated fibers and 20 parts of the hollow-type conjugated fibers, and as the second fiber 40 parts of the elastic thermally-fusible fibers were used. The shaped cushioning layer had a 25% hardness of 20.0 kgf.

EXAMPLE 10

In this example, Example 6 was repeated except in that the mixing ratio of the three types of fibers was modified. That is, as the first fiber, 60 parts of the solid-type conjugated fibers and 20 parts of the hollow-type conjugated fibers, and as the second fiber 20 parts of the elastic thermally-fusible fibers were used. The shaped cushioning layer had a 25% hardness of 40.0 kgf.

EXAMPLE 11

In this example, Example 1 was repeated except in that, as the first fiber, 60 parts of the solid-type conjugated fibers and 20 parts of the hollow-type conjugated fibers, and as the second fiber 10 parts of the elastic thermally-fusible conjugated fibers and 10 parts of nonelastic thermally-fusible conjugated fibers having a melting point of 110° C., a fineness of 2 deniers and a length of 51 mm were used. The shaped cushioning layer had a 25% hardness of 10.0 kgf.

EXAMPLE 12

In this example, Example 11 was repeated except in that the mixing ratio of the four types of fibers was modified. That is, as the first fiber, 70 parts of the solid-type conjugated fibers and 20 parts of the hollow-type conjugated fibers, and as the second fiber 5 parts of the elastic thermally-fusible fibers and 5 parts of the nonelastic thermally-fusible fibers were used. The shaped cushioning layer had a 25% hardness of 8.0 kgf.

EXAMPLE 13

In this example, Example 1 was repeated except in that, as the first fiber, 60 parts of the solid-type conjugated fibers and 20 parts of the hollow-type conjugated fibers, and as the second fiber 10 parts of elastic thermally-fusible conjugated fibers having a melting point of 170° C., a fineness of 15 deniers and a length of 51 mm and 10 parts of nonelastic thermally-fusible conjugated fibers having a melting point of 110° C., a fineness of 15 deniers and a length of 51 mm were used. The shaped cushioning layer had a 25% hardness of 8.0 kgf.

EXAMPLE 14

In this example, Example 13 was repeated except in that the mixing ratio of the four types of fibers was modified. That is, as the first fiber, 40 parts of the solid-type conjugated fibers and 20 parts of the hollow-type conjugated fibers, and as the second fiber 20 parts of the elastic thermally-fusible fibers and 20 parts of the nonelastic thermally-fusible fibers were used. The shaped cushioning layer had a 25% hardness of 8.0 kgf.

EXAMPLE 15

In this example, Example 1 was repeated, except in that the nonwoven fabric was prepared so as to have a weight per unit area of 250 g/m$^2$ at a thickness of 10 mm and that the nonwoven fabric was shaped to have a thickness of 5 mm. The shaped cushioning layer had a 25% hardness of 10.0 kgf.

EXAMPLE 16

In this example, Example 1 was repeated, except in that the nonwoven fabric was prepared so as to have a weight per unit area of 500 g/m$^2$ at a thickness of 15 mm and that the nonwoven fabric was shaped to have a thickness of 10 mm. The shaped cushioning layer had a 25% hardness of 10.0 kgf.

EXAMPLE 17

In this example, Example 1 was repeated, except in that the nonwoven fabric was prepared so as to have a weight per unit area of 1,500 g/m$^2$ at a thickness of 45 mm and that the nonwoven fabric was shaped to have a thickness of 30 mm. The shaped cushioning layer had a 25% hardness of 10.0 kgf.

EXAMPLE 18

In this example, Example 1 was repeated, except in that the nonwoven fabric was prepared so as to have a weight per unit area of 2,500 g/m$^2$ at a thickness of 75 mm and that the nonwoven fabric was shaped to have a thickness of 50 mm. The shaped cushioning layer had a 25% hardness of 10.0 kgf.

COMPARATIVE EXAMPLE 1

In this comparative example, a foamed urethane was used for the cushioning layer, in place of the nonwoven fabric. This foamed urethane was prepared as follows. A first solution consisting of 100 parts of propylene oxide-1,2,6-hexanetriol as a polyol, 2 parts of water, one part of a surface active agent and 0.5 parts of carbon black, and a second solution consisting of 100 parts of tolylenediisocyanato and 0.5 parts of a silicone oil were injected at a low pressure into a foaming mold having a clearance of 20 mm and then were foamed therein. The thus obtained foamed urethane sheet had a thickness of 20 mm, an apparent density of 0.06 g/cm$^3$, and a 25% hardness of 15.0 kgf.

Similar to Comparative Example 1, each of the cushioning layers according to the aftermentioned Comparative Examples 2–4 also had an apparent density of 0.06 g/cm$^3$. Each of the cushioning layers according to the aftermentioned Comparative Examples 5–18 had an apparent density of 0.05 g/cm$^3$.

Using the foamed urethane sheet as a cushioning layer, a laminate of the steel plate and the sound insulating structure formed thereon was prepared in the same manner as in Example 1, except in that the foamed urethane sheet was bonded to the backing layer with a spray-type adhesive.

In addition to the evaluation tests of Example 1, the following test was further conducted on the laminated (sample).

4. TRANSMISSIBILITY OF VIBRATION TO THE SOLE OF A FOOT

A load of 5 kgf equivalent to that added to the floor carpet by an average human foot was placed on the sample, using an iron disk having a diameter of 150 mm equivalent to the sole surface of an average human foot. Then, under this condition, the sample was subjected to a forced vibration with a constant force of 5N, and the transmissibility of vibration (the vibration transmission gain) at a frequency of 30 Hz was measured. The results are shown in the column of "Vibration Trans. to Foot" in Table 4.

Similar to the results of Table 1, the comparative results of Comparative Example 1 as compared with another Comparative Example are shown in Table 4. In Table 4, "D" means, for example, in the first row, that Comparative Example 1 is inferior to Comparative Example 2, with respect to the sound transmission loss within a frequency range from 400 to 1,000 Hz. In Table 1, "Vibration Trans. to Foot" represents

COMPARATIVE EXAMPLE 2

In this comparative example, Comparative Example 1 was repeated except in that, as a backing layer, a sheet of ethylenevinylacetate copolymer (EVA) containing calcium carbonate as a filler was used, in place of the polyethylene sheet having a weight per unit area of 600 g/m$^3$. This EVA sheet had a weight per unit area of 1,500 g/m$^3$. The cushioning layer had a 25% hardness of 15.0 kgf.

COMPARATIVE EXAMPLE 3

In this comparative example, a commercial felt sheet (FELTOP (tradename) made by Howa Seni Kogyo Co.) was used. This felt sheet had a thickness of 20 mm, an apparent density of 0.06 g/cm$^3$, and a 25% hardness of 5.0 kgf.

Using this felt sheet as a cushioning layer a laminate of the steel plate and the sound insulating structure formed thereon was prepared in the same manner as in Example 1.

The same evaluation tests, as those of Comparative Example 1 were conducted on the laminate (sample).

COMPARATIVE EXAMPLE 4

In this comparative example, Comparative Example 3 was repeated except in that, as a backing layer, the EVA sheet of Comparative Example 2 was used. The cushioning layer had a 25% hardness of 5.0 kgf.

COMPARATIVE EXAMPLE 5

In this comparative example, Example 1 was repeated except in that 20 parts of common nonelastic thermally-fusible conjugated fiber having a melting point of 110° C., a fineness of 2 deniers and a length of 51 mm were used for preparing a nonwoven fabric, in place of the elastic thermally-fusible conjugated fibers, that the nonwoven fabric was heated up to a temperature of 175° C., and that the same evaluation tests as those in Comparative Example 1 were conducted on the sample. The cushioning layer had a 25% hardness of 10.0 kgf.

COMPARATIVE EXAMPLE 6

In this comparative example, Comparative Example 5 was repeated except in that 70 parts of the solid-type conjugated fibers, 20 parts of the hollow-type conjugated fibers, and 10 parts of the nonelastic thermally-fusible conjugated fibers were used. The cushioning layer had a 25% hardness of 8.0 kgf.

COMPARATIVE EXAMPLE 7

In this comparative example, Comparative Example 5 was repeated except in that 75 parts of the solid-type conjugated fibers, 20 parts of the hollow-type conjugated fibers, and 5 parts of the nonelastic thermally-fusible conjugated fibers were used. The cushioning layer had a 25% hardness of 6.0 kgf.

COMPARATIVE EXAMPLE 8

In this comparative example, Comparative Example 5 was repeated except in that 40 parts of the solid-type conjugated fibers, 20 parts of the hollow-type conjugated fibers, and 40 parts of the nonelastic thermally-fusible conjugated fibers were used. The cushioning layer had a 25% hardness of 25.0 kgf.

COMPARATIVE EXAMPLE 9

In this comparative example, Comparative Example 5 was repeated except in that 20 parts of the solid-type conjugated fibers, 20 parts of the hollow-type conjugated fibers, and 60 parts of the nonelastic thermally-fusible conjugated fibers were used. The cushioning layer had a 25% hardness of 50.0 kgf.

COMPARATIVE EXAMPLE 10

In this comparative example, Comparative Example 5 was repeated except in that 60 parts of the solid-type conjugated fibers, 20 parts of the hollow-type conjugated fibers, and 20 parts of common nonelastic thermally-fusible conjugated fibers having a melting point of 110° C., a fineness of 15 deniers and a length of 51 mm were used. The cushioning layer had a 25% hardness of 8.0 kgf.

COMPARATIVE EXAMPLE 11

In this comparative example, Comparative Example 10 was repeated except in that 70 parts of the solid-type conjugated fibers, 20 parts of the hollow-type conjugated fibers, and 10 parts of the nonelastic thermally-fusible conjugated fibers were used. The cushioning layer had a 25% hardness of 6.0 kgf.

COMPARATIVE EXAMPLE 12

In this comparative example, Comparative Example 10 was repeated except in that 75 parts of the solid-type conjugated fibers, 20 parts of the hollow-type conjugated fibers, and 5 parts of the nonelastic thermally-fusible conjugated fibers were used. The cushioning layer had a 25% hardness of 4.0 kgf.

COMPARATIVE EXAMPLE 13

In this comparative example, Comparative Example 10 was repeated except in that 40 parts of the solid-type conjugated fibers, 20 parts of the hollow-type conjugated fibers, and 40 parts of the nonelastic thermally-fusible conjugated fibers were used. The cushioning layer had a 25% hardness of 20.0 kgf.

COMPARATIVE EXAMPLE 14

In this comparative example, Comparative Example 10 was repeated except in that 60 parts of the solid-type conjugated fibers, 20 parts of the hollow-type conjugated fibers, and 20 parts of the nonelastic thermally-fusible conjugated fibers were used. The cushioning layer had a 25% hardness of 40.0 kgf.

COMPARATIVE EXAMPLE 15

In this comparative example, Comparative Example 5 was repeated except in that 60 parts of the solid-type conjugated fibers, 20 parts of the hollow-type conjugated fibers, and 20 parts of the nonelastic thermally-fusible conjugated fibers were used, that the nonwoven fabric was prepared so as to have a weight per unit area of 250 g/m$^2$ at a thickness of 10 mm, and that the nonwoven fabric was shaped by the press machine to have a thickness of 5 mm. The cushioning layer had a 25% hardness of 10.0 kgf.

COMPARATIVE EXAMPLE 16

In this comparative example, Comparative Example 15 was repeated except in that the nonwoven fabric was prepared so as to have a weight per unit area of 500 g/m$^2$ at a thickness of 15 mm and that the nonwoven fabric was shaped to have a thickness of 10 mm. The cushioning layer had a 25% hardness of 10.0 kgf.

COMPARATIVE EXAMPLE 17

In this comparative example, Comparative Example 15 was repeated except in that the nonwoven fabric was prepared so as to have a weight per unit area of 1,500 g/m$^2$ at a thickness of 45 mm and that the nonwoven fabric was shaped to have a thickness of 30 mm. The cushioning layer had a 25% hardness of 10.0 kgf.

COMPARATIVE EXAMPLE 18

In this comparative example, Comparative Example 15 was repeated except in that 60 parts of the solid-type conjugated fibers, 20 parts of the hollow-type conjugated fibers, and 20 parts of the nonelastic thermally-fusible conjugated fibers were used, that the nonwoven fabric was prepared so as to have a weight per unit area of 2,500 g/m$^2$ at a thickness of 75 mm and that the nonwoven fabric was shaped to have a thickness of 50 mm. The cushioning layer had a 25% hardness of 10.0 kgf.

As is seen from Tables 1–3, with respect to the results of the sound transmission loss of the samples having the cushioning layers of the same thicknesses, when the samples of Examples are compared with those of Comparative Examples, the former was much superior to the latter, within the road-noise range (i.e. a frequency range from 250 to 700 Hz); and the former was superior to or at least equal to the latter, within the overall range (i.e. a frequency range from 250 to 6,400 Hz).

As is seen from Tables 1–3, with respect to the results of the sound transmission loss of the samples having the cushioning layers of the same weight per unit area thereof, the samples of Examples were superior to or at least equal to those of Comparative Examples.

As is seen from Tables 1–3, with respect to the results of the cushioning effect test of the samples having the cushioning layers of the same thickness, Examples 1–14 were superior to Comparative Examples 3 and 4 in which a commercial felt was used in place of the nonwoven fabric of the present invention.

According to the present invention, density of the cushioning layer can be reduced by 10–30%, for obtaining the same sound insulation and the same cushioning effect, by the nonwoven fabric of the present invention, as those obtained by the urethane foamed body and the felt. Thus, it is possible to make the sound insulation structure light in weight.

As is mentioned above, the sound insulating structure of the present invention is high in sound transmission loss factor within the road-noise frequency range and particularly superior in sound insulation at the normal temperature. Furthermore, the sound insulating structure of the present invention has an adequate cushioning effect and can be reduced in weight.

TABLE 1

|  | Sound Transmission Loss | | | Cushioning Effect |
| --- | --- | --- | --- | --- |
|  | 250–700 Hz | 700 Hz < | 250–6,400 Hz |  |
| Example 1 relative to Com. Ex. 1 | A | A | A | B |
| Example 1 relative to Com. Ex. 2 | C | B | B | B |
| Example 1 relative to Com. Ex. 3 | A | A | A | A |
| Example 1 relative to Com. Ex. 4 | B | B | A | A |
| Example 1 relative to Com. Ex. 5 | A | C | B | B |
| Example 2 relative to Com. Ex. 1 | A | A | A | B |
| Example 2 relative to Com. Ex. 2 | C | B | B | B |
| Example 2 relative to Com. Ex. 3 | A | A | A | A |
| Example 2 relative to Com. Ex. 4 | B | B | A | A |
| Example 2 relative to Com. Ex. 6 | A | C | B | B |
| Example 3 relative to Com. Ex. 1 | A | A | A | B |
| Example 3 relative to Com. Ex. 2 | C | B | B | B |
| Example 3 relative to Com. Ex. 3 | A | A | A | A |
| Example 3 relative to Com. Ex. 4 | B | B | A | A |
| Example 3 relative to Com. Ex. 7 | A | C | B | B |
| Example 4 relative to Com. Ex. 1 | A | A | A | B |
| Example 4 relative to Com. Ex. 2 | C | B | B | B |
| Example 4 relative to Com. Ex. 3 | A | A | A | A |
| Example 4 relative to Com. Ex. 4 | B | B | A | A |
| Example 4 relative to Com. Ex. 8 | A | C | B | B |
| Example 5 relative to Com. Ex. 1 | A | A | A | B |
| Example 5 relative to Com. Ex. 2 | C | B | B | B |
| Example 5 relative to Com. Ex. 3 | A | A | A | A |
| Example 5 relative to Com. Ex. 4 | B | B | A | A |
| Example 5 relative to Com. Ex. 9 | A | C | B | B |
| Example 6 relative to Com. Ex. 1 | A | A | A | B |
| Example 6 relative to Com. Ex. 2 | C | B | B | B |
| Example 6 relative to Com. Ex. 3 | A | A | A | A |
| Example 6 relative to Com. Ex. 4 | B | B | A | A |
| Example 6 relative to Com. Ex. 10 | A | C | B | B |

TABLE 2

|  | Sound Transmission Loss | | | Cushioning Effect |
| --- | --- | --- | --- | --- |
|  | 250–700 Hz | 700 Hz < | 250–6,400 Hz |  |
| Example 7 relative to Com. Ex. 1 | A | A | A | C |
| Example 7 relative to Com. Ex. 2 | C | B | B | B |
| Example 7 relative to Com. Ex. 3 | A | A | A | A |
| Example 7 relative to Com. Ex. 4 | B | B | A | A |
| Example 7 relative to Com. Ex. 11 | A | C | B | B |
| Example 8 relative to Com. Ex. 1 | A | A | A | B |
| Example 8 relative to Com. Ex. 2 | C | B | B | B |
| Example 8 relative to Com. Ex. 3 | A | A | A | A |

TABLE 2-continued

|  | Sound Transmission Loss | | | Cushioning |
|---|---|---|---|---|
|  | 250–700 Hz | 700 Hz < | 250–6,400 Hz | Effect |
| Example 8 relative to Com. Ex. 4 | B | B | A | A |
| Example 8 relative to Com. Ex. 12 | A | C | B | B |
| Example 9 relative to Com. Ex. 1 | A | A | A | C |
| Example 9 relative to Com. Ex. 2 | C | B | B | B |
| Example 9 relative to Com. Ex. 3 | A | A | A | A |
| Example 9 relative to Com. Ex. 4 | B | B | A | A |
| Example 9 relative to Com. Ex. 13 | A | C | B | B |
| Example 10 relative to Com. Ex. 1 | A | A | A | B |
| Example 10 relative to Com. Ex. 2 | C | B | B | B |
| Example 10 relative to Com. Ex. 3 | A | A | A | A |
| Example 10 relative to Com. Ex. 4 | B | B | A | A |
| Example 10 relative to Com. Ex. 14 | A | C | B | B |
| Example 11 relative to Com. Ex. 1 | A | A | A | B |
| Example 11 relative to Com. Ex. 2 | C | B | B | B |
| Example 11 relative to Com. Ex. 3 | A | A | A | A |
| Example 11 relative to Com. Ex. 4 | B | B | A | A |
| Example 11 relative to Com. Ex. 5 | A | C | B | B |
| Example 12 relative to Com. Ex. 1 | A | A | A | B |
| Example 12 relative to Com. Ex. 2 | C | B | B | B |
| Example 12 relative to Com. Ex. 3 | A | A | A | A |
| Example 12 relative to Com. Ex. 4 | B | B | A | A |
| Example 12 relative to Com. Ex. 6 | A | C | B | B |

TABLE 3

|  | Sound Transmission Loss | | | Cushioning |
|---|---|---|---|---|
|  | 250–700 Hz | 700 Hz < | 250–6,400 Hz | Effect |
| Example 13 relative to Com. Ex. 1 | A | A | A | B |
| Example 13 relative to Com. Ex. 2 | C | B | B | B |
| Example 13 relative to Com. Ex. 3 | A | A | A | A |
| Example 13 relative to Com. Ex. 4 | B | B | A | A |
| Example 13 relative to Com. Ex. 10 | A | C | B | B |
| Example 14 relative to Com. Ex. 1 | A | A | A | B |
| Example 14 relative to Com. Ex. 2 | C | B | B | B |
| Example 14 relative to Com. Ex. 3 | A | A | A | A |
| Example 14 relative to Com. Ex. 4 | B | B | A | A |
| Example 14 relative to Com. Ex. 13 | A | C | B | B |
| Example 15 relative to Com. Ex. 15 | A | C | B | B |
| Example 16 relative to Com. Ex. 16 | A | C | B | B |
| Example 17 relative to Com. Ex. 17 | A | C | B | B |
| Example 18 relative to Com. Ex. 18 | A | C | B | B |

TABLE 4

|  | Sound Transmission Loss | | | Cushioning | Vibration |
|---|---|---|---|---|---|
|  | 400–1,000 Hz | 1,000 Hz < | 250–6,400 Hz | Effect | Trans. to Foot |
| Com. Ex. 1 relative to Com. Ex. 2 | D | D | D | C | C |
| Com. Ex. 1 relative to Com. Ex. 3 | D | C | C | A | A |
| Com. Ex. 1 relative to Com. Ex. 4 | D | D | D | A | A |
| Com. Ex. 2 relative to Com. Ex. 1 | A | A | A | C | C |
| Com. Ex. 2 relative to Com. Ex. 3 | B | A | B | A | A |
| Com. Ex. 2 relative to Com. Ex. 4 | D | C | C | A | A |
| Com. Ex. 3 relative to Com. Ex. 1 | B | C | C | D | D |
| Com. Ex. 3 relative to Com. Ex. 2 | D | D | D | D | D |
| Com. Ex. 3 relative to Com. Ex. 4 | D | D | D | C | C |
| Com. Ex. 4 relative to Com. Ex. 1 | A | A | B | D | D |
| Com. Ex. 4 relative to Com. Ex. 2 | A | C | B | D | D |
| Com. Ex. 4 relative to Com. Ex. 3 | A | A | A | C | C |

TABLE 4-continued

|  | Sound Transmission Loss | | | Cushioning | Vibration |
|---|---|---|---|---|---|
|  | 400–1,000 Hz | 1,000 Hz < | 250–6,400 Hz | Effect | Trans. to Foot |
| Com. Ex. 5 relative to Com. Ex. 1 | B | A | B | B | B |
| Com. Ex. 5 relative to Com. Ex. 2 | D | B | C | B | B |
| Com. Ex. 5 relative to Com. Ex. 3 | A | A | A | A | A |
| Com. Ex. 5 relative to Com. Ex. 4 | C | B | B | A | A |
| Com. Ex. 6 relative to Com. Ex. 1 | B | A | B | B | B |
| Com. Ex. 6 relative to Com. Ex. 2 | D | B | C | B | B |
| Com. Ex. 6 relative to Com. Ex. 3 | A | A | A | A | A |
| Com. Ex. 6 relative to Com. Ex. 4 | C | B | B | A | A |
| Com. Ex. 7 relative to Com. Ex. 1 | B | A | B | B | B |
| Com. Ex. 7 relative to Com. Ex. 2 | D | B | C | B | B |
| Com. Ex. 7 relative to Com. Ex. 3 | A | A | A | A | A |
| Com. Ex. 7 relative to Com. Ex. 4 | C | B | B | A | A |
| Com. Ex. 8 relative to Com. Ex. 1 | B | A | B | B | B |
| Com. Ex. 8 relative to Com. Ex. 2 | D | B | C | B | B |
| Com. Ex. 8 relative to Com. Ex. 3 | A | A | A | A | A |
| Com. Ex. 8 relative to Com. Ex. 4 | C | B | B | A | A |

TABLE 5

|  | Sound Transmission Loss | | | Cushioning | Vibration |
|---|---|---|---|---|---|
|  | 400–1,000 Hz | 1,000 Hz < | 250–6,400 Hz | Effect | Trans. to Foot |
| Com. Ex. 9 relative to Com. Ex. 1 | B | A | B | B | B |
| Com. Ex. 9 relative to Com. Ex. 2 | D | B | C | B | B |
| Com. Ex. 9 relative to Com. Ex. 3 | A | A | A | A | A |
| Com. Ex. 9 relative to Com. Ex. 4 | C | B | B | A | A |
| Com. Ex. 10 relative to Com. Ex. 1 | B | A | B | B | B |
| Com. Ex. 10 relative to Com. Ex. 2 | D | B | C | B | B |
| Com. Ex. 10 relative to Com. Ex. 3 | A | A | A | A | A |
| Com. Ex. 10 relative to Com. Ex. 4 | C | B | B | A | A |
| Com. Ex. 11 relative to Com. Ex. 1 | B | A | B | B | B |
| Com. Ex. 11 relative to Com. Ex. 2 | D | B | C | B | B |
| Com. Ex. 11 relative to Com. Ex. 3 | A | A | A | A | A |
| Com. Ex. 11 relative to Com. Ex. 4 | C | B | B | A | A |
| Com. Ex. 12 relative to Com. Ex. 1 | B | A | B | B | C |
| Com. Ex. 12 relative to Com. Ex. 2 | D | B | C | B | C |
| Com. Ex. 12 relative to Com. Ex. 3 | A | A | A | A | A |
| Com. Ex. 12 relative to Com. Ex. 4 | C | B | B | A | A |
| Com. Ex. 13 relative to Com. Ex. 1 | B | A | B | B | B |
| Com. Ex. 13 relative to Com. Ex. 2 | D | B | C | B | B |
| Com. Ex. 13 relative to Com. Ex. 3 | A | A | A | A | A |
| Com. Ex. 13 relative to Com. Ex. 4 | C | B | B | A | A |
| Com. Ex. 14 relative to Com. Ex. 1 | B | A | B | B | B |
| Com. Ex. 14 relative to Com. Ex. 2 | D | B | C | B | B |
| Com. Ex. 14 relative to Com. Ex. 3 | A | A | A | A | A |
| Com. Ex. 14 relative to Com. Ex. 4 | C | B | B | A | A |

What is claimed is:

1. A sound insulating structure found on a steel automobile floor panel on which at least one of a vibration and a sound is incident, said structure comprising:
   a covering layer of carpet for covering the panel; and
   a cushioning layer for reducing an impact of the at least one of the vibration and the sound, said cushioning layer being interposed between said covering layer and the panel and made of a nonwoven fabric, said nonwoven fabric comprising
   5–95 wt % of a first fiber having a fineness within a range from 1.5 to 40 deniers, a first melting point, and a first portion comprising polyethylene terephthalate, and
   5–95 wt % of a second fiber having a fineness within a range from 1.5 to 15 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total of said first and second fibers being 100 wt %.

2. A structure according to claim 1, wherein said nonwoven fabric comprises 20–80 wt % of said first fiber and 20–80 wt % of said second fiber.

3. A structure according to claim 1, wherein said elastic copolyester has a tan δ of at least 0.1 at a temperature within a range from 15° to 40° C., said tan δ being a ratio of a loss elasticity of said elastic copolyester to a storage modulus of said elastic copolyester, and wherein said first and second fibers are bonded together by fusing said elastic copolyester.

4. A structure according to claim 1, wherein said first fiber is a conjugated fiber having an inside which is free of a hollow space.

5. A structure according to claim 1, further comprising a backing layer for backing therewith said covering layer, said backing layer being interposed between said covering layer and said cushioning layer and comprising a thermoplastic resin.

6. A structure according to claim 1, wherein said cushioning layer has a hardness such that said cushioning layer is compressed by 25% when said cushioning layer receives a load ranging from 4 to 60 kgf.

7. A structure according to claim 1, wherein said cushioning layer has a thickness within a range from 2 to 50 mm.

8. A structure according to claim 1, wherein said nonwoven fabric has an apparent density within a range from 0.03 to 0.1 g/cm$^3$.

9. A structure according to claim 1, wherein said first melting point is at least 200° C.

10. A structure according to claim 1, wherein said elastic copolyester has a heat of fusion of up to 6 cal/g.

11. A structure according to claim 6, wherein said cushioning layer has a hardness such that said cushioning layer is compressed by 25% when said cushioning layer receives a load ranging from 5 to 40 kgf.

12. A sound insulating structure found on a panel on which at least one of a vibration and a sound is incident, said structure comprising:

a covering layer for covering the panel; and a cushioning layer for reducing an impact of the at least one of the vibration and the sound, said cushioning layer being interposed between said covering layer and the panel and made of a nonwoven fabric, said nonwoven fabric comprising 5–95 wt % of a first fiber having a fineness within a range from 1.5 to 40 deniers, a first melting point, and a first portion comprising polyethylene terephthalate, and 5–95 wt % of a second fiber having a fineness within a range from 1.5 to 5 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total of said first and second fibers being 100 wt %, wherein said at least one other monomer of said elastic copolyester comprises a first glycol having a chain of at least four methylene groups.

13. A sound insulating structure found on a panel on which at least one of a vibration and a sound is incident, said structure comprising:

a covering layer for covering the panel; and a cushioning layer for reducing an impact of the at least one of the vibration and the sound, said cushioning layer being interposed between said covering layer and the panel and made of a nonwoven fabric, said nonwoven fabric comprising 5–95 wt % of a first fiber having a fineness within a range from 1.5 to 40 deniers, a first melting point, and a first portion comprising polyethylene terephthalate, and 5–95 wt % of a second fiber having a fineness within a range from 1.5 to 15 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total of said first and second fibers being 100 wt %, wherein said first fiber has a second portion comprising a copolymer prepared by copolymerizing polyethylene terephthalate and at least one monomer selected from the group consisting of a second glycol which is different from ethylene glycol, a dibasic acid which is different from terephthalic acid, and an hydroxycarboxylic acid, and wherein said first and second portions of said first fiber are bonded together and eccentrically positioned with each other.

14. A structure according to claim 13, wherein said second glycol is one selected from the group consisting of trimethylene glycol, tetramethylene glycol, diethylene glycol, pentaerythritol, and bisphenol A, wherein said dibasic acid is one selected from the group consisting of aromatic dicarboxylic acids and fatty acid dicarboxylic acids, and wherein said hydroxycarboxylic acid is para-hydroxybenzoic acid.

15. A sound insulating structure found on a panel on which at least one of a vibration and a sound is incident, said structure comprising:

a covering layer for covering the panel; and a cushioning layer for reducing an impact of the at least one of the vibration and the sound, said cushioning layer being interposed between said covering layer and the panel and made of a nonwoven fabric, said nonwoven fabric comprising 5–95 wt % of a first fiber having a fineness within a range from 1.5 to 40 deniers, a first melting point, and a first portion comprising polyethylene terephthalate, and 5–95 wt % of a second fiber having a fineness within a range from 1.5 to 15 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total of said first and second fibers being 100 wt %, wherein said first fiber is a fiber mixture comprising a first conjugated fiber portion having an inside which is free of a hollow space and a second conjugated fiber portion which has an inside having a hollow space and amounts to 20–35 wt % based on the weight of said first conjugated fiber portion.

16. A sound insulating structure capable of being employed on a steel automobile floor panel on which at least one of a vibration and a sound is incident, said structure comprising:

a covering layer of carpet for covering the panel; and a cushioning layer for reducing an impact of the at least one of the vibration and the sound, said cushioning layer being interposed between said covering layer and the panel and made of a nonwoven fabric, said nonwoven fabric comprising 5–95 wt % of a first fiber having a fineness within a range from 1.5 to 40 deniers, a first melting point, and a first portion comprising polyethylene terephthalate, and 5–95 wt % of a second fiber having a fineness within a range from 1.5 to 15 deniers and a core portion and a sheath portion covering said core portion, a majority of said core portion comprising polyethylene terephthalate, said sheath portion comprising an elastic copolyester which has a second melting point that is lower than said first melting point and is not higher than 200° C., said elastic copolyester being prepared by copolymerizing polyethylene terephthalate and at least one other monomer, a total of said first and second fibers being 100 wt %.

* * * * *